United States Patent [19]

Inoue

[11] Patent Number: 4,707,079
[45] Date of Patent: Nov. 17, 1987

[54] LIQUID CRYSTAL PANEL HAVING UNIAXIALLY-STRETCHED SUBSTRATES

[75] Inventor: Hiroshi Inoue, Kawasaki, Japan

[73] Assignee: Canon Kabushiki Kaisha, Tokyo, Japan

[21] Appl. No.: 925,786

[22] Filed: Oct. 31, 1986

Related U.S. Application Data

[62] Division of Ser. No. 698,828, Feb. 6, 1985, Pat. No. 4,643,531.

[30] Foreign Application Priority Data

Feb. 15, 1984 [JP] Japan .................................. 59-26683
Feb. 15, 1984 [JP] Japan .................................. 59-26684
Feb. 15, 1984 [JP] Japan .................................. 59-26685

[51] Int. Cl.⁴ ................................................. G02F 1/13
[52] U.S. Cl. ................................. 350/334; 350/339 R
[58] Field of Search ............................ 350/334, 339 R

[56] References Cited

U.S. PATENT DOCUMENTS

4,388,375 6/1983 Hopper et al. .................. 350/339 R
4,409,268 10/1983 Inoue et al. ...................... 350/339 R
4,501,471 2/1985 Culley et al. ........................ 350/334
4,505,546 3/1985 Umeda et al. .................... 350/339 R
4,533,214 8/1985 Penz et al. ........................... 350/334
4,586,790 5/1986 Umeda et al. .................... 350/339 R

*Primary Examiner*—Stanley D. Miller
*Assistant Examiner*—Richard F. Gallivan
*Attorney, Agent, or Firm*—Fitzpatrick, Cella, Harper & Scinto

[57] ABSTRACT

A liquid crystal panel comprising base plates, at least one of which is a plastic base plate provided with a transparent electrode, and a liquid crystal interposed between the substrates, is provided by forming an orientation controlling film of a composition comprising an organic indium compound and an organic zirconium compound or of a composition comprising an organic indium compound, a polyester resin and an isocyanate resin on the plastic substrate, or is produced by arranging at least two monoaxially stretched films as the substrates so that their stretched directions are in parallel or in counter-directionally parallel with each other.

7 Claims, 15 Drawing Figures

LIQUID CRYSTAL PANEL HAVING UNIAXIALLY-STRETCHED SUBSTRATES

This is a division of application Ser. No. 698,828, filed Feb. 6, 1985, now U.S. Pat. No. 4,643,531.

BACKGROUND OF THE INVENTION

The present invention relates to a liquid crystal panel comprising a pair of base plates, at least one of which is a plastic plate, and a liquid crystal material interposed between the base plates.

Most liquid crystal panels practically used heretofore have a structure in which a pair of transparent base plates such as those of inorganic glass or plastic are respectively provided with a transparent electrode, e.g., of tin oxide, indium oxide or a composite of these and subjected to a homogeneous or horizontal orientation treatment, and a liquid crsytal is disposed between the base plates, whereby a voltage can be applied between the electrodes. As methods, for the homogeneous or horizontal orientation treatment, the following methods (a) to (d) have been conducted heretofore.

(a) Rubbing of a base plate with, e.g., a cotton cloth in one direction.

(b) Oblique or tilt vapor deposition of SiO or $SiO_2$.

(c) Rubbing of a film of an organosilane, a linear polyamide, a polyimide, etc., formed on a base plate.

(d) Irradiation of a high energy beam such as electron beam or plasma discharge.

The above methods are effective for the homogeneous orientation treatment of inorganic glass plates but have not been fully effective with respect to plastic substrates.

Thus, in the method (a), the resultant orientation performance does not last for a long term and cannot resist aging at 45° C. or above. In the method (b), the temperature at which the base plate is heated to ensure the intimate adhesion thereto of deposited SiO or $SiO_2$ film exceeds the heat deformation temperature of a plastic plate (below about 150° C.) and causes deformation of the base plate. On the contrary, if the vapor deposition is conducted while the base plate is heated to a lower temperature, the deposited film has a poor adhesion to the plastic base plate and has a low resistance to aging. In the method (c), an orientation controlling aid such as an organosilane (a trialkoxymonoalkylsiloxane, ordinarily called a silane coupling agent, is generally used and, especially, 3-aminopropyltriethoxysilane is frequently used) has a poor resistivity to aging. On the other hand, when a polyimide film which is most widely used is intended to be formed, the plastic base plate cannot resist the temperature (250° C. or above) required for polymerizing a polyamide acid (or a polyamide-imide) which is a precursor of a polyimide. In the method (d), due to irradiation with a high energy beam, the plastic plate or transparent electrode deteriorates. Moreover, this method is not adapted for mass production, and an advantage from the viewpoint of production resulting from the use of a plastic base plate is lost.

Figure 4:
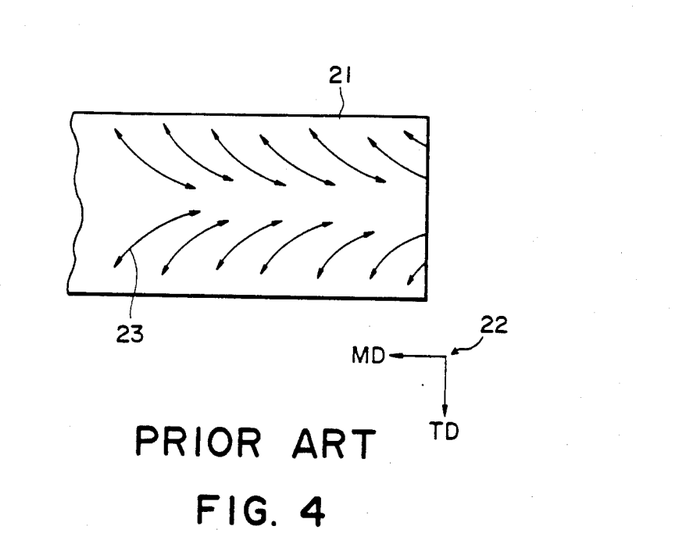
FIG. 4 is an explanatory view for illustrating an optical anisotropy of a biaxially stretched polyester film.

Further, a biaxially stretched polyester film having a thickness of the order of 100 μm has been used as a plastic film substrate for TN-type liquid crystal devices in view of various properties such as film properties (heat-deformation resistance, chemical resistance, gas-barrier property), appearance (transparency, smoothness), cost, electrical resistance (100−1 kΩ/cm²) and adhesion to the substrate of a transparent electrode (formed, e.g., by vapor deposition or low-temperature sputtering of indium oxide on a surface-treated film), and little change in performance with the elapse of time. However, a biaxially stretched polyester film has optical anisotropy as shown in FIG. 4. In FIG. 4, reference numeral 21 denotes a biaxially stretched polyester film, 22 directions of film stretching, and 23 a direction of an optical axis (direction of optical rotation). As the biaxially stretched polyester film has an optical anisotropy as shown in the figure, it is accompanied with a difficulty in selection and combination of optical axes of the films and a problem such as occurrence of interference color depending on visual field angle. In order to solve these problems, a monoaxially stretched polyester film has been used recently. However, a monoaxially stretched polyester film has a larger heat shrinkage in the MD direction (machine direction) compared with a biaxially stretched polyester film. Therefore, a uniform gap of the order of 10 μm required for a liquid crystal panel cannot be obtained by mere adjustment of films with respect to the optical axes as has been conventionally carried out. Further, a large displacement between the pair of electrodes has occurred due to heat shrinkage, whereby degradation of display qualities has occurred or poor continuity at contacts with the pair of electrodes has occurred.

Table 1 below shows comparison of heat shrinkages between a biaxially stretched polyester film and a monoaxially stretched polyester film after they were heated for 1 hour in an oven of 150° C.

TABLE 1

| | Film | |
|---|---|---|
| Direction | Biaxially stretched polyester film | Monoaxially stretched polyester film |
| TD* | −0.23% | 0.05% |
| MD* | 0.56% | 1.6% |

*TD: Transverse direction
MD: Machine direction

SUMMARY OF THE INVENTION

An object of the present invention is to provide a liquid crystal panel comprising a pair of base plates at least one of which comprises a transparent plastic base plate on which an orientation controlling film having a high aging resistance or an excellent long term performance has been formed at a temperature below the heat deformation temperature of the plastic base plate, without imparing a high productivity resulting from the use of a plastic base plate.

Another object of the present invention is to provide a liquid crystal panel with a high display quality which can be produced continuously with an adaptability for mass production resulting from the use of a plastic base plate, while avoiding the drawbacks of the conventional liquid crystal panels using a plastic base plate.

These and other objects of the present invention can be accomplished by a liquid crystal panel comprising a plastic base plate having a transparent electrode thereon which is provided with an orientation controlling film comprising an organic indium compound and an organic zirconium compound or an orientation controlling film comprising an organic indium compound, a polyester resin and an isocyanate resin.

A further characteristic of the present invention resides in a liquid crystal panel comprising plastic films as substrates, which comprises as the plastic films at least two monoaxially stretched films disposed to have their stretched directions in parallel or in counter-directionally parallel with each other and a liquid crystal filling the gap between the monoaxially stretched films.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The present invention will now be explained in detail with reference to the drawings.

Figure 1:
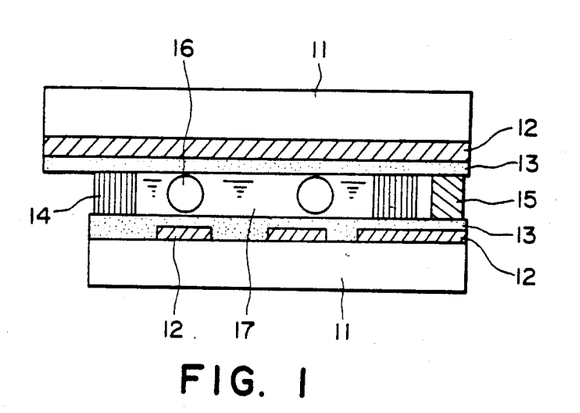
FIG. 1 is a sectional view showing an embodiment of the liquid crystal panel according to the present invention.

FIG. 1 shows an embodiment of the liquid crystal panel according to the present invention. The liquid crystal panel comprises a pair of plastic base plates 11 each provided with an electrode 12 of a transparent electroconductive film and an orientation controlling film 13, formed thereon. These base plates are secured to each other with a sealing member 14, a conductive member 15 conducting the electrodes 12 of the base plates and gap-forming members 16 disposed therebetween. A liquid crystal 17 is sealed in a space formed between or interposed between the base plates 11 with their faces having the orientation controlling films 13 facing each other.

The plastic base plate 11 is formed from a plastic such as polyethylene terephthalate, polybutylene terephthalate, polyethersulfone, polycarbonate, cellulose triacetate or polyol. On the base plate 11 is formed a transparent electroconductive film 12 of tin oxide, indium oxide, etc., by a known technique such as vacuum evaporation, low-temperature sputtering, or CVD (chemical vapor deposition).

In the present invention, the plastic base plate 11 having such a transparent electrode 12 is further provided with an orientation controlling film 13 comprising an organic indium compound and an organic zirconium compound.

The organic indium compound used in the present invention is preferably one represented by the general formula $In(OR)_3$, wherein R is an alkyl group. Specific examples thereof include $In(OC_2H_5)_3$, $In(OC_3H_7)_3$ and $In(OC_5H_{11})_3$. An organic indium compound having $R = -C_3H_7$ in the above general formula is especially preferred in view of production and handling thereof.

The organic zirconium compound include those of the alkoxy type such as tetraisopropoxyzirconium $(Zr(i-OC_3H_7)_4)$ and the chelate type such as zirconium acetylacetonate $(Zr(CH_3COCHCOCH_3)_4)$. From the viewpoints of stability of reaction with the above mentioned organic indium compound, orientation performance for liquid crystals, film formation characteristic and handling, the latter chelate type is especially preferred.

The orientation controlling film 13 may be formed in a single layer or in two layers. The proportions between the organic metal compounds in the orientation controlling film vary depending on the structure of the film, i.e., whether the film comprises a single layer or two layers.

Structure 1: A single layer of mixture of an organic indium compound and an organic zirconium compound.

Figure 2:
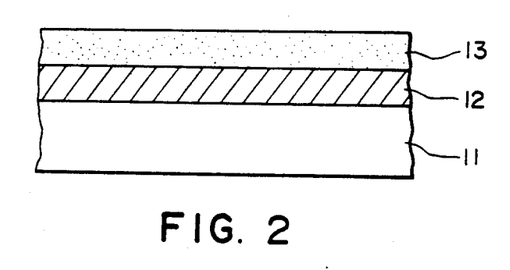
FIG. 2 is a sectional view illustrating a base plate with a single layer orientation controlling film.

A single layer of the mixture as shown in FIG. 2 preferably comprises 100 to 1000 parts by weight, particularly 500 to 1000 parts by weight, of the organic zirconium compound with respect to 1 part by weight of the organic indium compound (calculated as $In_2O_3$ based on the amount of In contained therein) in view of the film forming characteristic and orientation performance. More specifically, when an alkoxy type of the organic indium compound and a chelate type of the organic zirconium compound are used, too small an amount of the organic indium compound results in an inferior durability of the orientation performance and a larger amount of the organic indium compound generally increases the durability of the orientation performance. However, when the organic indium compound is used in an amount exceeding the upper limit, the orientation performance per se is impaired or lost.

Structure 2: A double layer structure with a first layer of a mixture comprising the organic indium compound and the organic zirconium compound and a second layer of either the organic zirconium compound or organic indium compound.

Figure 3:
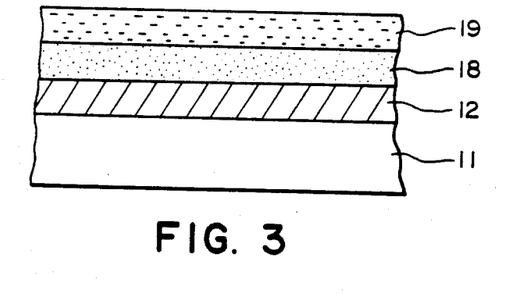
FIG. 3 is a sectional view illustrating a base plate with a double layer orientation controlling film.

A structure as shown in FIG. 3 comprising a first layer 18 containing both of the organic metal compounds and a second layer 19 formed thereon comprising either one of the organic compounds facilitates the improvement in film formability and durability of the orientation performance compared with the above structure 1.

The first layer should preferably comprise 10 to 100 parts, particularly 20 to 50 parts, by weight of the organic zirconium compound with respect to 1 part by weight of the organic indium compound (calculated as $In_2O_3$).

The second layer contains only one kind of the organic metal compounds and therefore has no compositional limitation. However, when the second layer is formed by coating and drying a solution of an organic metal compound, it is preferred that the solution contains 1-5 wt. % of the organic metal compound. This is because too low a concentration results in an insufficient orientation performance whereas too high a concentration results in such difficulties as waving of the resultant film, occurrence of interference color in reflected light due to refractive index and increase in resistance above the transparent electroconductive film.

The solvent to be used for dissolving the organic metal compounds is selected through consideration of storage stability of the solution, vaporizability required for formation of the orientation controlling film, remaining in the film, effect on the substrate, etc., in addition to solubility of the organic metal compound therein. Specific examples of the solvent are explained in the working examples described hereinafter.

A solution containing the above ingredient satisfying the above requirement is coated on a substrate and dried at 60° to 150° C. to form an orientation controlling film. The orientation controlling film should preferably have a thickness of 100 Å or less, particularly 20–50 Å or have a dry coating amount of 0.005–0.05 g/m². If the two layer structure is desired, the second layer is formed in a similar manner after the first layer is formed. In this case, each layer should preferably have a thickness or dry coating amount as described above.

The film thus formed is then rubbed with a cotton cloth, etc., under a static pressure of 20 to 200 g/cm², preferably around 100 g/cm² to give an orientation controlling film. A liquid crystal is charged to fill a gap between a pair of base plates, at least one of which is a plastic base plate with an orientation controlling film prepared as above, whereby a liquid crystal panel according to the present invention is obtained.

The orientation controlling film as explained above for giving the liquid crystal panel according to the present invention can be easily formed by a method such as dipping, spraying and spinner coating, without requiring a vacuum step, a patterning step (etching for development, peeling) or a printing step. Accordingly, the orientation controlling film is adapted to continuous mass production. Thus, a liquid crystal display panel using a plastic film substrate can be easily manufactured because the orientation controlling film can be stably formed without requiring a high temperature for the film formation.

In the present invention, the orientation controlling film 13 as shown in FIG. 2 can also be a film comprising an organic indium compound, a polyester resin and an isocyanate resin.

The organic indium compound (referred to as "component A") is selected from those explained above, i.e., is preferably one represented by the general formula In(OR)₃, wherein R is an alkyl group. Specific examples thereof include $In(OC_2H_5)_3$, $In(OC_3H_7)_3$ and $In(OC_5H_{11})_3$. An organic indium compound having R=—C₃H₇ in the above general formula is especially preferred in view of production and handling thereof.

The polyester resin (referred to as "compound B") is preferably a linear saturated polyester. Specific examples of the polyester resin include saturated polyesters or copolymers thereof obtained by reaction of one or more of saturated polycarboxylic acids such as terephthalic acid, isophthalic acid, adipic acid, sebacic acid, and trimellitic anhydride, one or more of saturated polyols such as ethylene glycol, propylene glycol, and neopentyl glycol; and optionally a vinyl monomer such as styrene, methyl methacrylate, and diallyl phthalate in the presence of various initiators or promoters. A copolymer polyester, i.e., a polyester comprising two or more carboxylic acids and a polyol or a polyester comprising a carboxylic acid and two or more polyols, is preferred. A polyester comprising terephthalic acid as a principal acid constituent and having a melting point Tm satisfying 60° C.<Tm<150° C. is especially preferred in view of convenience in formation of the orientation controlling film, heat resistance and reactivity.

The isocyanate resin (referred to as "component C") includes an isocyanate group (—NCO)-containing compound alone or a mixture thereof with a substance having a group such as a hydroxyl group (—OH), amino group (—NH₂) or carboxyl group (—COOH) reactive with the isocyanate group and is characterized by a high polarity and reactivity due to the isocyanate group. Examples of the isocyanate resin include triphenylmethane-triisocyante (Trade name: Desmodur R), tris(4-phenylisocyanate)thiophosphate (Trade name: Desmodur RF), TDI (tolylene diisocyanate) dimer (Trade name: Desmodur TT), TDI trimer (Trade name: Desmodur IL), 2,4,4'-diphenylethertriisocyanate (Trade name: Hylen DM), HDI (methylene di-paraphenylene isocyanate) (Trade name: Coronate AP), and a polyisocyanate such as a reaction product of TDI and trimethylolpropane (Trade name: Coronate L). These isocyanate compounds are considered to react with the polyester to improve the film property of the orientation controlling film. A polyisocyanate is especially preferred in view of toxicity, easiness of handling, storage stability, and reactivity for formation of the orientation controlling film.

The orientation controlling film should preferably contain the components A, B and C in weight proportions of A/B/C=5–20/20–100/1–10 (A being calculated as $In_2O_3$), more preferably A/B/C=10/30–60/2–5, and most preferably A/B/C in weight proportions around 10/40/3 in view of stability of the orientation performance.

The components A, B and C are applied on the substrate in the form of a solution. Preferred examples of the solvent to be used for the purpose include those of a ketone type such as acetone, methyl ethyl ketone and dimethyl ketone, and those of a cyclic ether type such as tetrahydrofuran and dioxane. A particular solvent to be used is selected in consideration of such factors as dissolving power for the respective components, non-reactability with the components, evaporation during the formation of the orientation controlling film and remaining in the film.

The components A, B and C should preferably be used in a proportion of 0.1 to 5% by weight in total and particularly 1% by weight or less, in view of orientation performance and formation of a uniform film.

A solution containing the components for forming the orientation controlling film satisfying the above conditions is applied on a substrate and dried at a temperature of from 60° C. to 150° C. to form a film with a thickness of preferably 100 Å or less, particularly preferably 20–50 Å. The film is then rubbed with a cotton cloth, etc., under a static pressure of 20 to 200 g/cm², preferably around 100 g/cm² to give an orientation controlling film. A liquid crystal is filled between a pair of base plates, at least one of which is a plastic base plate with an orientation controlling film prepared as above, whereby a liquid crystal panel according to the present invention is obtained.

The orientation controlling film as explained above for giving the liquid crystal panel according to the present invention can be easily formed by a method such as dipping, spraying and spinner coating without requiring a vacuum step, a patterning step (etching for development, peeling) or a printing step. Accordingly, the orientation controlling film is adapted to continuous mass production. Thus, a liquid crystal display panel using a plastic film substrate can be easily manufactured because the orientation controlling film can be stably formed without requiring a high temperature for the film formation.

Figure 5:
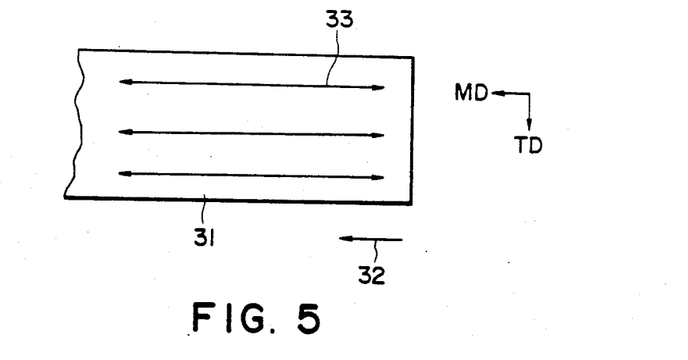
FIG. 5 is an explanatory view for illustrating a relationship between the stretched direction and the optical axis of a monoaxially stretched polyester film.

FIG. 5 illustrates a relationship between the stretching direction 32 and the optical axis direction 33 of a monoaxially stretched polyester film 31. When FIG. 5 is compared with FIG. 4 illustrating a biaxially stretched polyester film, the monoaxial stretching gives a film having a simple and uniform relationship between the stretching direction and optical axis. Accordingly, a substrate for a liquid crystal panel can be easily cut out uniformly and continuously from the film, thus a high productivity is attained.

Figure 6A:
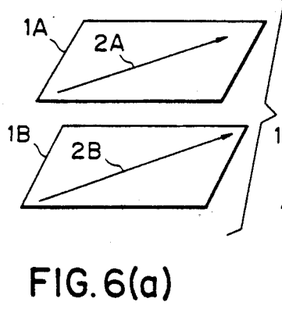
FIGS. 6(a), 6(b) and 6(c) and FIGS. 7(a), 7(b) and 7(c) are explanatory views illustrating several embodiments of the liquid crystal panel according to the present invention.
Figures 6B, 6C:
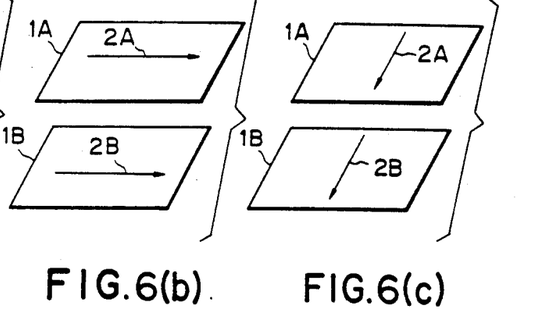
Figures 7A, 7B, 7C:
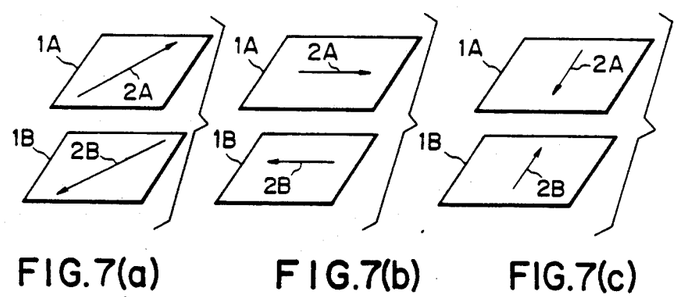
Figure 8:
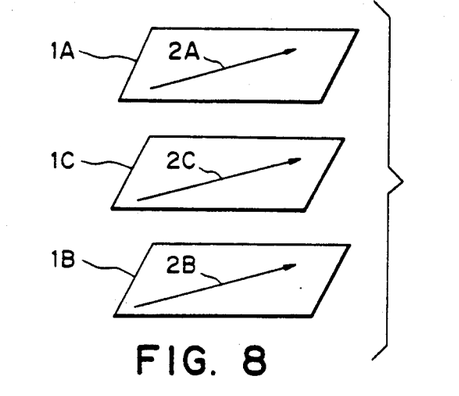
FIG. 8 is an explanatory view illustrating another embodiment of the liquid crystal panel according to the present invention.

FIGS. 6, 7 and 8 show various examples of combined arrangements of 2 or 3 substrates formed from a monoaxially stretched polyester film. Liquid crystal panels are obtained by filling liquid crystals between the substrates. In the figures, reference numeral 1A denotes an upper panel substrate, 1B a lower panel substrate, and 1C an intermediate substrate. Reference numerals 2A, 2B and 2C denote stretched directions of upper, lower and intermediate panel substrates, respectively. The liquid crystals filled between the panel substrates are not shown in the figures.

FIGS. 6(a), 6(b) and 6(c) illustrate the arrangement of upper and lower panel substrates with their stretched directions being in (co-directionally) parallel with each other in an oblique direction, the MD direction and the TD direction, respectively. FIGS. 7(a), 7(b) and 7(c) illustrate the arrangement of upper and lower panel substrates with their stretched directions being in counter-directionally parallel with each other in an oblique direction, the MD direction and the TD direction. FIG. 8 illustrates the arrangement of the three panel substrates with their stretching directions being in parallel with each other in an oblique direction.

According to the above described relationships or arrangement between the substrates, conventional difficulties accompanying the use of monoaxially stretched films such as warping or distortion of panel or occurrence of irregular gap due to heat shrinkage are prevented.

Figures 9A, 9B:
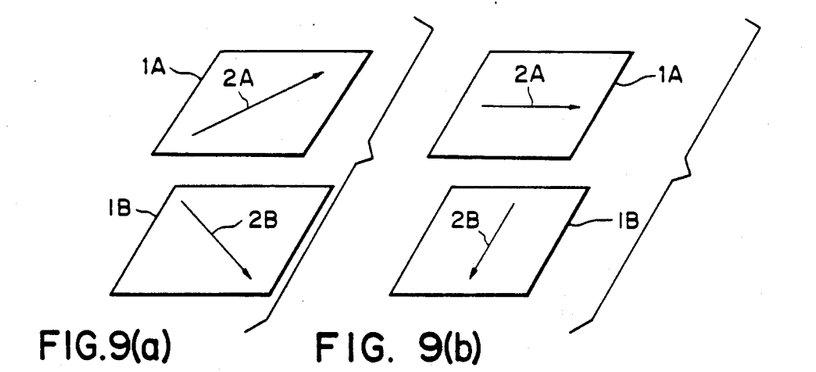
FIGS. 9(a) and 9(b) respectively illustrate a comparative example of a liquid crystal display panel.

FIGS. 9(a) and 9(b) respectively show comparative examples, in each of which upper and lower substrates are so arranged that their stretched directions cross each other to form right angles. In these cases, when these films are secured to each other under heating (at 80° C. to 150° C.), the resulting panel is noticeably warped or distorted, and a gap between the substrate also becomes irregular.

Figure 10:
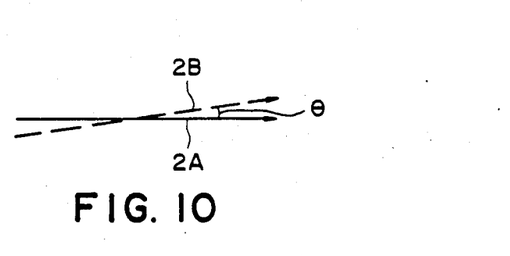
FIG. 10 is a view for explaining a relationship between the stretched directions of a pair of panel base plates.

The degree of parallelism between the stretched directions of the upper and lower substrates depends on the temperature at which they are heated. Generally, the angle $\theta$ (see FIG. 10) between the stretched direction 2A of the upper substrate and the stretched direction 2B of the lower substrate should desirably be 10° or less, particularly 5° or less.

As described hereinabove, according to the present invention monoaxially stretched films are used as liquid crystal panel substrates and their stretched directions are held in co-directionally parallel or counter-directionally parallel with each other, whereby several difficulties accompanying the use of monoaxially stretched films as substrates for a liquid crystal panel such as warping or distortion of the panel and irregularity of gap due to heat shrinkage are obviated. Further, even if an electrode pattern is deformed due to heat shrinkage, the deformation occurs in common with upper and lower substrates, whereby undesirable displacement of electrode patterns between the substrates hardly occur. Accordingly, the degradation of display quality or conduction errors between the upper and lower electrodes is prevented. Moreover, an electrode pattern after heat treatment can be accurately determined by designing the pattern while taking the rate of shrinkage into considertion in advance. Thus, a liquid crystal panel using a plastic film substrate can be continuously produced without impairing its advantage of adaptability to mass production.

Liquid crystals to be uesd in the present invention include TN (twisted nematic)-type liquid crystals, for example.

The present invention will be further described in detail with reference to examples. It should be understood that the present invention is not limited to the following examples.

EXAMPLE 1

There was provided a plastic film substrate comprising polyethylene terephthalate film of 100 μm in thickness on which a transparent electroconductive film consisting mainly of indium oxide had been formed by using a low-temperature sputtering apparatus while maintaining the film temperature below 120° C. On the electroconductive film of the plastic film substrate, a solution of the following composition was applied at a rate of 1 g/m$^2$ by spinner coating (1000 rpm) and dried at 120° C. for 30 minutes to form a film.

| | | |
|---|---|---|
| $Zr(CH_3COCHCOCH_3)_4$ | 1 | g |
| $In(OC_3H_7)_3$*[1] | 2.5 | mg (calculated as $In_2O_3$) |
| Et OH | 100 | ml |

*[1] Because of hydrolyzability in air, $In(OC_3H_7)_3$ was supplied as a 2.5% (1.25 wt. % calculated as $In_2O_3$) solution in the following solvent system.

| Solvent system: | | |
|---|---|---|
| | n-buthanol | 16% |
| | isopropyl alcohol | 20% |
| | acetylacetone | 2% |
| | propionic acid | 24% |
| | ethyl alcohol | 32% |
| | turpentine oil | 6% |

The coating film was then rubbed in one direction with a cotton cloth under a pressure of 100 g/cm$^2$. A pair of the thus obtained substrates were stacked on each other with their rubbing directions crossing each other with right angles. A pyrimidine-type nematic liquid crystal ($\Delta\epsilon > 0$, LaRoche RO-TN-619) was filed in a gap between the substrates to form a liquid crystal panel.

COMPARATIVE EXAMPLE 1

A liquid crystal panel was prepared in the same manner as in Example 1 except that a solution not containing $In(OC_3H_7)_3$ was used.

COMPARATIVE EXAMPLE 2

A liquid crystal panel was prepared in the same manner as in Example 1 except that a solution not containing $Zr(CH_3COCHCOCH_3)_4$ was used.

EXAMPLE 2

On the plastic substrate of Example 1, the following solution A was applied at a rate of 1 g/m$^2$ and dried at 120° C. for 20 minutes, and the following solution B was applied at a rate of 1 g/m² and dried at 120° C. for 20 minutes.

A liquid crystal panel was prepared by repeating the rubbing and subsequent steps of Example 1 while using a pair of the above substrates.

| Solution A: | |
|---|---|
| In(OC$_3$H$_7$)$_3$*¹ | 50 mg (as In$_2$O$_3$) |
| Zr(CH$_3$COCHCOCH$_3$)$_4$ | 1 g |
| Et OH | 100 ml |
| Solution B: | |
| Zr(CH$_3$COCHCOCH$_3$)$_4$ | 2 g |
| Et OH | 100 ml. |

*¹The same form as in Example 1.

The liquid crystal panels prepared in the above Examples and Comparative Examples were subjected to a durability test. The results are shown in Table 2 below.

TABLE 2

Orientation performance after the durability test

| panel | Initial stage | 80° C., 10 min. | 80° C., 60 min. | 80° C., 480 min. |
|---|---|---|---|---|
| Example 1 | O | O | O | O |
| Example 2 | O | O | O | O |
| Comparative Example 1 | O | Δ | X | — |
| Comparative Example 2 | X | — | — | — |

O: Uniform orientation
Δ: Partially poor orientation (Defects such as domains and rubbing streaks appeared)
X: Homogeneous orientation not attained or 50% or less of oriented region.

Orientation performance was evaluated by placing a liquid crystal panel between a pair of polarizers with their polarizing directions crossing each other with right angles, and by observing a light passing through the panel from the normal direction with respect to the panel face.

EXAMPLE 3

On the same plastic film substrate with the electro-conductive film as in Example 1, a solution of the following composition was applied and dried at 120° C. for 30 minutes.

| Tetrahydrofuran/methyl ethyl ketone | 10 ml/90 ml |
|---|---|
| In(OC$_3$H$_7$)$_3$*¹ | 31.25 mg (as In$_2$O$_3$) |
| Saturated copolymer polyester*² | 62.5 mg |
| Polyisocyanate*³ | 4.7 mg |

*¹The same form as in Example 1
*²Vilon 30P, available from Toyobo K.K. A crystalline saturated copolymer polyester comprising terephthalic acid as a principal acid component. M.W. = 18000-20000, Tg = −28° C., Melt Viscosity: 2000 cps (200° C.), m.p. = 125° C.
*³Coronate L. A 75% solution of a reaction product of 3 mols of tolylene diisocyanate (TDI) and 1 mol of trimethylolpropane in ethyl acetate.

The coating film was then rubbed in one direction with a cotton cloth under a pressure of 100 g/cm². A pair of the thus obtained substrates were stacked on each other with their rubbing directions crossing each other with right angles. A pyrimidine-type nematic liquid crystal (Δε>0, Loche RO-TN-619) was filled in a gap between the base plates to form a liquid crystal panel.

EXAMPLE 4

A liquid crystal panel was prepared in the same manner as in Example 3 except that the crystalline saturated copolymer polyester consisting principally of terephthalic acid was replaced by an amorphous saturated copolymer polyester (Vilon 300 available from Toyobo, K.K., Molecular weight: 20000-25000, Tg=7° C., Melt viscosity=800 cps (200° C.), Softening point=123° C.).

EXAMPLE 5

A liquid crystal panel was prepared in the same manner as in Example 3 except that the polyisocyanate was replaced by triphenylmethane triisocyanate (Trade name: Desmodur R).

COMPARATIVE EXAMPLE 3

A liquid crystal panel was prepared in the same manner as in Example 3 except that a solution of a composition not containing the organic indium compound was used.

COMPARATIVE EXAMPLE 4

A liquid crystal panel was prepared in the same manner as in Example 3 except that a solution not containing the organic indium compound nor the isocyanate resin was used.

COMPARATIVE EXAMPLE 5

A liquid crystal panel was prepared in the same manner as in Example 3 except that a solution not containing the unsturted polyester nor the isocyanate resin was used.

The liquid crystal panels prepared in Examples 3-5 and Comparative Examples 3-5 were subjected to the durability test.

The results are summarized in Table 3 below.

TABLE 3

Orientation performance after the durability test

| Panel | Initial stage | 80° C., 10 min. | 80° C., 60 min. | 80° C., 480 min. |
|---|---|---|---|---|
| Example | | | | |
| 3 | O | O | O | O |
| 4 | O | O | O | Δ |
| 5 | O | O | O | O |
| Comparative Example | | | | |
| 3 | O | O | Δ | Δ |
| 4 | O | Δ | X | — |
| 5 | X | — | — | — |

The methods and standards of evaluation of the orientation performance are the same as those explained with reference to Table 2.

What is claimed is:

1. A liquid crystal panel comprising plastic films as substrates, which comprises as the plastic films at least two monoaxially stretched films disposed to have their stretched directions substantially in parallel or in counter-directionally parallel with each other and a liquid crystal filling the gap between the monoaxially stretched films.

2. The liquid crystal panel according to claim 1, the stretched direction of a monoaxially stretched plastic film forming one substrate forms an angle of 10° or less with the stretched direction of another monoaxially stretched polyester film forming the other substrate.

3. The liquid crystal panel according to claim 1, the stretched direction of a monoaxially stretched plastic film forming one substrate forms an angle of 5° or less with the stretched direction of another monoaxially stretched polyester film forming the other substrate.

4. The liquid crystal panel according to claim 1, wherein the stretched directions of said at least two monoaxially stretched films are in a direction oblique to the machine direction of the films.

5. The liquid crystal panel according to claim 1, wherein the stretched directions of said at least two monoaxially stretched films are along the machine direction of the films.

6. The liquid crystal panel according to claim 1, wherein the stretched directions of said at least two monoaxially stretched films are along the transverse direction of the films.

7. The liquid crystal panel according to claim 1, wherein said monoaxially stretched films comprise a monoaxially stretched polyester film.

* * * * *